United States Patent [19]

Douglas et al.

[11] Patent Number: 4,671,882

[45] Date of Patent: Jun. 9, 1987

[54] PHOSPHORIC ACID/LIME HAZARDOUS WASTE DETOXIFICATION TREATMENT PROCESS

[75] Inventors: Gary R. Douglas, Waterloo, Iowa; Paul F. Kusy, Coal Valley; Ralph D. Grotelueschen, East Moline, both of Ill.

[73] Assignee: Deere & Company, Moline, Ill.

[21] Appl. No.: 792,636

[22] Filed: Oct. 28, 1985

Related U.S. Application Data

[63] Continuation of Ser. No. 528,031, Aug. 31, 1983, abandoned.

[51] Int. Cl.$^4$ .............................................. C02F 1/56
[52] U.S. Cl. .................................... 210/720; 210/721; 210/725; 210/727; 210/901; 210/904; 210/912; 210/913; 423/55; 423/305
[58] Field of Search ................... 75/108, 109; 210/609, 210/710, 720, 721, 724–728, 751, 756, 904, 912, 913, 914, 901; 423/55, 305, 306; 501/155

[56] References Cited

U.S. PATENT DOCUMENTS

| | | | |
|---|---|---|---|
| 2,754,174 | 7/1956 | Roberts | 75/120 |
| 2,797,143 | 6/1957 | Arendale et al. | 210/724 |
| 3,311,447 | 3/1967 | Stuart | 423/43 |
| 3,575,853 | 4/1971 | Gaughan et al. | 210/725 |
| 3,583,909 | 6/1971 | Block | 210/906 |
| 3,617,569 | 11/1971 | Daniels | 210/906 |
| 3,655,552 | 4/1972 | Flock et al. | 252/181 |
| 3,673,083 | 6/1972 | Sawyer et al. | 210/906 |
| 3,826,741 | 7/1974 | Nakamura | 210/913 |
| 3,843,516 | 10/1974 | Uamada et al. | 210/904 |
| 4,003,833 | 1/1977 | Cavender | 210/904 |
| 4,005,009 | 1/1977 | Kinoshita et al. | 210/913 |
| 4,025,430 | 5/1977 | Pagel | 210/912 |
| 4,049,853 | 4/1977 | Cocozza | 106/109 |
| 4,072,605 | 2/1978 | Thelander | 423/34 |
| 4,176,060 | 11/1979 | Sury et al. | 210/904 |
| 4,210,667 | 5/1980 | Liao | 210/724 |
| 4,321,149 | 3/1982 | Hawxhurst et al. | 210/720 |
| 4,342,653 | 8/1982 | Halverson | 210/734 |
| 4,402,750 | 9/1983 | Okamura et al. | 501/155 |

FOREIGN PATENT DOCUMENTS

1253057  1/1961  France .

OTHER PUBLICATIONS

"Leachate Testing of Hazardous Chemicals from Stabilized Automotive Wastes," Stablex Corp., Jan. 1979.
IV Conversion Systems—Waste Management Process, Philadelphia, Pa.
Survey of Solidification/Stabilization Technology For Hazardous Ind. Wastes, Env. Lab., Vicksburg, Miss., p. 1–39.
EPA, Title 40 CFR 261, Appendix II.
Environmental Science & Technology, vol. 12, No. 8, Aug. 1978, pp. 896–899, American Chemical Society, US, M. Kieszkowski et al.
The Condensed Chemical Dictionary, Tenth Edition, p. 853, 1981.

Primary Examiner—Peter Hruskoci
Attorney, Agent, or Firm—Burns, Doane, Swecker & Mathis

[57] ABSTRACT

A process for producing a non-hazardous sludge from an aqueous solution which contains heavy metals comprising the steps of: (a) adding phosphoric acid or an acid phosphate salt to the aqueous solution to precipitate the heavy metals; (b) lowering the pH of the solution to less than about 5.0; (c) adding a coagulant to the solution; (d) raising the pH of the solution to above about 7.0 by the addition of a calcium source; and (e) dewatering the resulting non-hazardous sludge.

17 Claims, 1 Drawing Figure

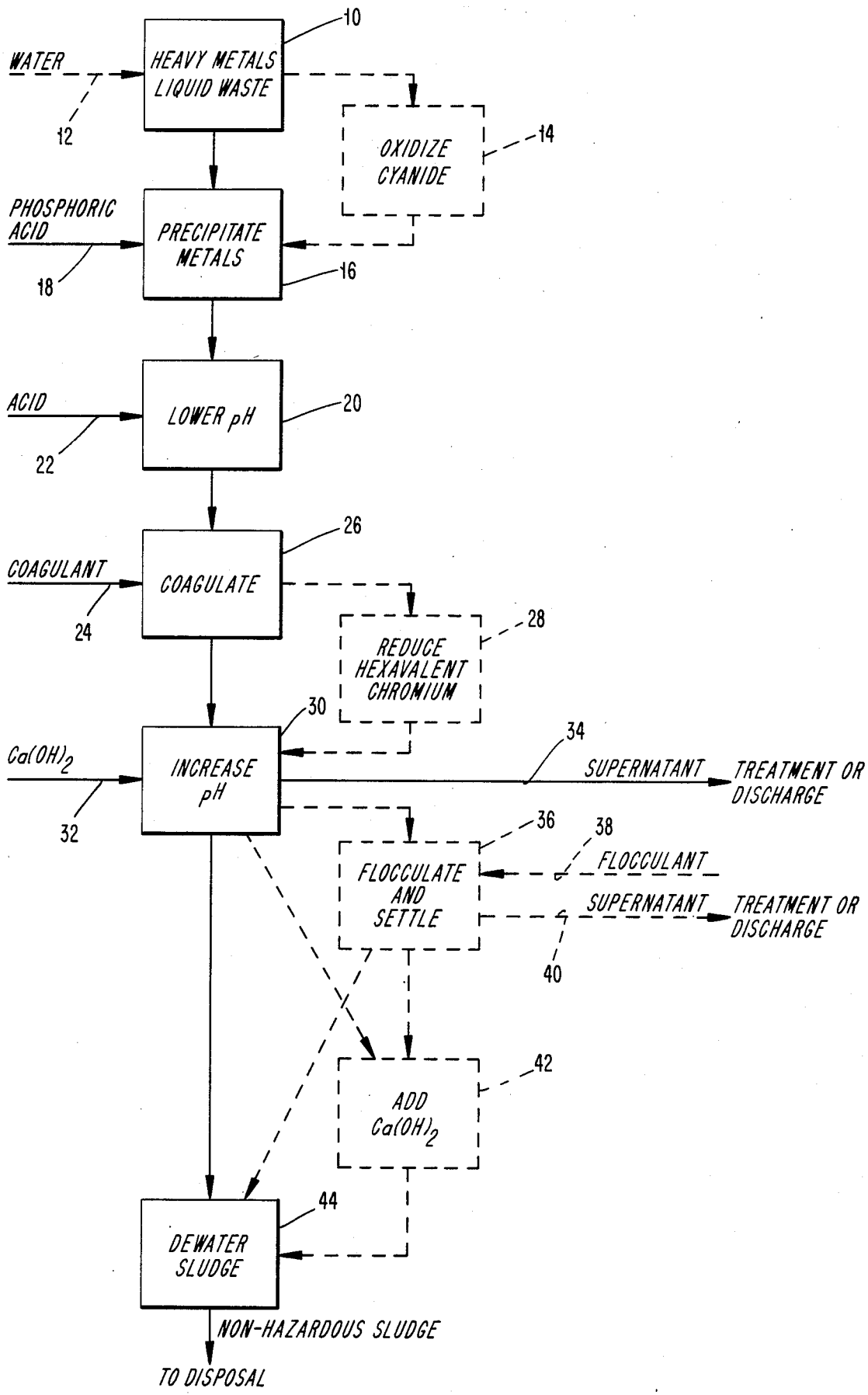

PHOSPHORIC ACID/LIME HAZARDOUS WASTE DETOXIFICATION TREATMENT PROCESS

This application is a continuation of application Ser. No. 528,031, filed Aug. 31, 1983, now abandoned.

BACKGROUND OF THE INVENTION

1. Field of the Invention

The present invention relates to the treatment of liquid wastes which contain heavy metals.

2. Description of the Prior Art

Resource Conservation Recovery Act (RCRA) regulations require that wastes containing lead, chromium, cadmium, arsenic, mercury, selenium, silver or barium leach minimum concentrations of these metals to be legally defined as non-hazardous. The Environmental Protection Agency (EPA) has specified a standard test, the Extraction Procedure (EP) toxicity test, to determine compliance with the leachable metal concentration allowances. This test is described in 40 C.F.R. §261, Appendix II. Wastes that fail the EP toxicity test are hazardous and must be disposed of in permitted RCRA facilities. This can be difficult and expensive. Therefore, a process that removes and retards metals leachability ensuring that hazardous wastes are rendered non-hazardous would be a benefit to current waste management options.

Existing processes to reduce chemical mobility in wastes are mostly encapsulation processes, whereby various encapsulants are added to the waste, (i.e., liquids or semi-solids) to turn the waste into a solid. Examples of such encapsulants are cement and sodium silicate, asphalt, glass, and various polymers and chemicals. Emphasis is placed on creating a hard solid mass which water cannot penetrate. Encapsulation processes are used as final wastewater treatment steps to render sludges and liquids non-leachable. Unfortunately, encapsulation processes tend to be expensive and often greatly increase the amount of material for disposal, and may be subject to leaching if the encapsulation seal later fails.

Moreover, traditional heavy metals bearing wastewater treatments use lime or NaOH to precipitate the metals. Thus, metal hydroxides are precipitated, which hydroxides have a comparatively high solubility. Certain of the hydroxides are also amphoteric, i.e., soluble at low and high pH. Generally, the pH of treatment solutions must be maintained between about 6 and 10 to achieve maximum metal hydroxide insolubility. Furthermore, even after precipitation, the resulting sludge may not pass the EP toxicity test.

Therefore, a need exists for a process for treating liquid waste which contains heavy metals, which process results in the production of a non-hazardous sludge which can be disposed of in a landfill, and a liquid with the heavy metals content having been reduced to levels acceptable for discharge into existing sewer systems.

SUMMARY OF THE INVENTION

The present invention is a process for producing a non-hazardous sludge from an aqueous solution which contains heavy metals comprising the steps of: (a) adding phosphoric acid or an acid phosphate salt to the aqueous solution to precipitate the heavy metals; (b) lowering the pH of the solution to less than about 5.0; (c) adding a coagulant to the solution; (d) raising the pH of the solution to above about 7.0 by the addition of a calcium source; and (e) dewatering the resulting non-hazardous sludge.

BRIEF DESCRIPTION OF THE DRAWING

FIG. 1 is a flowsheet of the process of the present invention.

DETAILED DESCRIPTION OF THE INVENTION

As stated above, the present invention relates to a process for producing a non-hazardous sludge from an aqueous solution which contains heavy metals. By non-hazardous is meant that the sludge obtained from the process has a leachability of less than that specified in the current Resource Conservation Recovery Act (RCRA) regulations when tested according to the test set forth in 40 C.F.R. §261, Appendix II. The current standards for the eight metals listed therein are:

| Metal | Concentration in ppm |
|---|---|
| Pb | 5 |
| Cr | 5 |
| Cd | 1 |
| As | 5 |
| Hg | 0.2 |
| Se | 1 |
| Ag | 5 |
| Ba | 100. |

In addition to those metals specifically set forth in the regulations, various other metals are often present in heavy metal waste solutions including zinc, cobalt, copper, and nickel. These metals will also be effectively treated by the present process.

The process of the present invention differs from the conventional processes of the prior art at least in that the present process is made a part of the wastewater treatment sequence. No attempt is made to encapsulate or solidify the sludges or liquids. Rather, the necessary reagents are added as a part of the wastewater treatment process. The process of the present invention is suitable for various types of liquid wastes. These include painting wastes, electroplating wastes, and even waste streams containing high concentrations of heavy metals, e.g., lead at 60,000 mg/l, provided that the wastewater is not highly contaminated with oil or grease.

One of the most important aspects of the present invention is the precipitation of the metal content by the use of phosphoric acid or acid phosphate salt to form metal phosphates. At least for the metals listed above, the metal phosphates are generally much more insoluble than the corresponding metal hydroxides or sulfates. Moreover, metal phosphates are not amphoteric. This combination of lower metals solubilities and the lack of amphoteric character provides the necessary chemistry which allows the production of a non-hazardous sludge, whereas the sludge from wastes treated with lime, alkali sulfate or sulfide to precipitate the heavy metals is hazardous.

The process of the present invention is more readily explained by reference to the flowchart of FIG. 1. In FIG. 1, optional steps are set forth by broken lines.

Heavy metals liquid waste 10 may be treated as received, or if necessary, additional water 12 can be added to dilute waste 10 to make it easier to process. Preferably, the solids content of waste 10 should not be greater than about 20% by weight.

If waste 10 contains a source of cyanide ion, it is preferably passed to cyanide oxidation step 14 prior to addition of phosphoric acid or acid phosphate salt. The cyanide oxidation can be performed by any of various methods well known in the art. Preferably, the cyanide oxidation is performed by alkaline chlorination using an oxidizing agent such as sodium hypochlorite to convert the cyanide ion to cyanate and nitrogen gas. If the pH of waste 10 is about 10 or above, no base need be added. If addition of a base is necessary, a preferred base is sodium hydroxide. Alkaline conditions are used to prevent the release of hydrogen cyanide gas. Typical treatment times are between about 45 minutes and an hour. The addition of oxidizing agent is continued until chlorine ion is detected at the end of the treatment period. Chlorine concentrations in excess of 100 ppm are not detrimental to the process, the oxidation being continued until the oxidation-reduction potential stabilizes.

The next step in the process is the metals precipitation step 16 which is accomplished by the addition of phosphoric acid 18 or an acid phosphate salt. Phosphoric acid 18 also tends to neutralize the solution. While not preferred, acid phosphate salts can be used, such as mono- or dihydrogen ammonium phosphate. However, acid phosphate salts of metals should typically be avoided since they add to the cations in solution. At least a sufficient amount of phosphoric acid 18 is added to provide a stoichiometric amount of phosphate to precipitate all the metals. Preferably, this amount will be between one and two times the stoichiometric amount (i.e., one to two mols of phosphate per mol of metals). Although even greater amounts may be used, care must be taken not to add so much that a buffering effect is seen. After phosphoric acid addition is complete, the mixture is preferably blended for about 15 to 30 minutes before proceeding to the next step.

The next step is pH lowering step 20 which is accomplished by the addition of acid 22. While various acids such as phosphoric acid or hydrochloric acid can be used as acid 22, it is preferred to use sulfuric acid since subsequent steps then result in neutralization to sulfate.

The amount by which the pH is lowered depends upon whether waste 10 includes hexavalent chromium metal. If no hexavalent chromium is present, then the pH in pH lowering step 20 need only be reduced sufficiently for coagulant 24 to function effectively in coagulating step 26. For example, a preferred coagulant 24 is ferric chloride which precipitates as ferric hydroxide at a pH of about 5.0–5.5. The pH will thus vary depending on the coagulant 24 used.

If waste 10 contains hexavalent chromium, the pH is preferably reduced to about 3.0 to facilitate hexavalent chromium reduction step 28, described further below.

If ferric chloride is used as coagulant 24, it is preferably used at between about 0.75 and about 1.5 g/l. Stirring is typically continued for about 3–5 minutes during which time coagulation occurs.

After coagulation step 26, hexavalent chromium reduction step 28 is preferably performed, although, if desired, it can be performed prior to coagulation step 26. Chromium reduction step 28 can be performed using any of various well known reducing agents, preferred agents being sodium metabisulfite, sulfur dioxide, and sodium sulfite. The reducing agent is added in an amount at least sufficient to reduce all hexavalent chromium present, typically an excess of about 10%, since stirring is continued until the reduction is complete as evidenced by stabilization of the oxidation-reduction potential.

The next step is pH increasing step 30. In this step, a calcium source such as calcium hydroxide 32 is added to increase the pH to at least about 7, and more preferably to a pH of at least about 8.5. By calcium source is meant material such as calcium hydroxide, calcium carbonate, or limestone. However, calcium hydroxide is much preferred because limestone may introduce other cations, and both calcium carbonate and limestone may result in the production of carbon dioxide gas when added to acid solution. Such gas evolution would generally adversely affect the process. The addition of a calcium source has several beneficial effects, including that any excess sulfuric acid and phosphoric acid used in previous steps will now be precipitated as calcium sulfate and calcium phosphate.

Although not preferred, the mixture can simply be allowed to settle for one to two hours, followed by passage of supernatant 34 to discharge or further treatment, e.g., removal of other ions. More preferably, after pH increase step 30, the mixture is treated by flocculation step 36 in which a flocculant 38 is added before the mixture is allowed to settle. Various flocculants are well known to those skilled in the art, preferred flocculants being anionic polymers.

Representative of such anionic polymers are a material sold by Drew Chemical Corp. under the tradename DREWFLOC 270, a material sold by Allied Chemical Corp. under the tradename CLARIFLOC A205P, and a material sold by Nalco Chemical Co. under the tradename NALCO 7711. The flocculant is typically added at between about 5 ppm and about 100 ppm, the amount used depending on the solids concentration in waste 10 and the nature of the solids.

After allowing the mixture to settle for about 1 to 2 hours, supernatant 40 is discharged or passed to further treatment.

Depending upon the concentration of metals in waste 10, the sludge from pH increasing step 30 or flocculation step 36 may need to be mixed with additional calcium hydroxide or other calcium source in calcium hydroxide addition step 42 prior to dewatering step 44. Typically, between about 15% and about 25% by weight of calcium hydroxide on a dry weight solids basis will be added and mixed throughly prior to dewatering. If the metals concentration in waste 10 does not exceed about 500 ppm, calcium hydroxide addition step 42 will generally not be needed.

Dewatering step 44 can be performed on any apparatus well known to those skilled in the art, vacuum filtering being preferred. The water content will typically be reduced to about 50–55% by weight.

The resulting sludge is non-hazardous as defined above and can be disposed of in an ordinary sanitary landfill. The metal within the sludge is bound so tightly that it is not released by the environment of such landfills.

All of the steps described above are typically performed at ambient temperature. However, other temperatures can be used if desired, provided they do not adversely affect the process.

To obtain a more complete understanding of the present invention, the following example is set forth. However, it should be understood that the invention is not limited to the specific details set forth in the following example.

EXAMPLE

The process of the present invention is performed on 100 ml of an aqueous solution containing the following concentrations of metals (in parts per million):

| Metal | Concentration (ppm) |
| --- | --- |
| Zn | 1500 |
| Pb | 10000 |
| Cr | 3000 |
| Cd | 40 |
| Cu | 20 |
| Ni | 60 |

To the aqueous solution is added about 700 ml of water. The solution is stirred for about 3 minutes, after which 2–4 ml of concentrated (75%) $H_3PO_4$ is added with stirring to precipitate the metals. Stirring is continued for about 30 minutes after $H_3PO_4$ addition, followed by the addition of 10 ml of concentrated sulfuric acid to reduce the pH to about 3.0, and then the addition of 1.2 g of ferric chloride (1500 mg/l).

After coagulation is complete, 5–20 g of $Na_2S_2O_5$ are added, and stirring is continued for about 10 minutes, followed by the addition of 20–100 g of calcium hydroxide which raises the pH to about 8.5. Subsequent to calcium hydroxide addition, 10–40 g of an anionic polymer flocculant sold under the tradename DREWFLOC 270 by Drew Chemical Corp. is added with stirring, and the mixture allowed to stand for one hour, after which the supernatant is decanted, and the sludge is recovered.

The supernatant contains the following concentrations of metals:

| Metal | Concentration (ppm) |
| --- | --- |
| Zn | 0.45 |
| Pb | 1 |
| Cr | 2 |
| Ni | 1 |
| Cu | 0.2 |
| Cd | 0.1 |

The sludge is dewatered and tested in accordance with the EP toxicity test of 40 C.F.R. §261, Appendix II and found to leach the following concentrations of metals:

| Metal | Concentration (ppm) |
| --- | --- |
| Zn | 1 |
| Pb | 2 |
| Cr | 3 |
| Ni | 0.21 |
| Cu | 0.02 |
| Cd | 0.02 |

All of the above fall within acceptable limits.

The same procedure without the phosphate precipitation results in a sludge leaching the following concentrations of metals when tested in the same manner:

| Metal | Concentration (ppm) |
| --- | --- |
| Zn | 43.4 |
| Pb | 70.5 |
| Cr | 6.5 |
| Ni | 5 |
| Cu | 0.05 |
| Cd | 0.04 |

While the invention has been described in terms of various preferred embodiments, one skilled in the art will appreciate that various modifications, substitutions, omissions, and changes may be made without departing from the spirit thereof. Accordingly, it is intended that the scope of the present invention be limited solely by the scope of the following claims.

What is claimed is:

1. A process for producing a non-hazardous sludge from an aqueous solution which contains heavy metals comprising the steps of:
   (a) adding phosphoric acid or an acid phosphate salt to the aqueous solution which contains a heavy metal or an aggregate of heavy metals at a hazardous level to precipitate the heavy metals as metal phosphates, the amount of phosphate added being at least one mol per mol of heavy metals;
   (b) lowering the pH of the solution to less than about 5.0;
   (c) adding a coagulant to the solution to coagulate the precipitated metal phosphates;
   (d) raising the pH of the solution to above about 7.0 by the addition of an alkaline calcium source capable of raising the pH to above about 7.0 to form a non-hazardous sludge including the coagulated metal phosphates; and
   (e) dewatering the resulting non-hazardous sludge to obtain a sludge which leaches less than the following concentrations of metals employing the test of 40 CFR §261, Appendix II:

| Metal | Concentration in ppm |
| --- | --- |
| Pb | 5 |
| Cr | 5 |
| Cd | 1 |
| As | 5 |
| Hg | 0.2 |
| Se | 1 |
| Ag | 5 |
| Ba | 100. |

2. The process of claim 1, wherein between about 1 and about 2 mols of phosphate are added per mol of heavy metals in the solution.

3. The process of claim 1, wherein phosphoric acid is used in step (a).

4. The process of claim 1, wherein in step (b) the pH is lowered by the addition of sulfuric acid.

5. The process of claim 1, wherein in step (b) the pH is lowered to about 3.0.

6. The process of claim 1, wherein in step (c) the coagulant is ferric chloride.

7. The process of claim 6, wherein the ferric chloride is added at between about 0.75 and about 1.5 g per liter.

8. The process of claim 1, wherein in step (d), the pH is raised by adding calcium hydroxide.

9. The process of claim 1, wherein in step (d), the pH is raised to at least about 8.5.

10. The process of claim 1, wherein the aqueous solution also contains cyanide ions, and a cyanide oxidation step is performed prior to step (a).

11. The process of claim 10, wherein the cyanide oxidation step is performed by the addition of sodium hypochlorite and sodium hydroxide.

12. The process of claim 1, wherein the heavy metals include hexavalent chromium, and a hexavalent chromium reduction step is performed between step (b) and step (d).

13. The process of claim 12, wherein the reduction is performed by adding sodium metabisulfite.

14. The process of claim 1, wherein a flocculant is added subsequent to step (d).

15. The process of claim 14, wherein the flocculant is an anionic polymer.

16. The process of claim 1, wherein calcium hydroxide is added to the sludge prior to step (e).

17. The process of claim 16, wherein the calcium hydroxide is added to the sludge at between about 15% and about 25% by weight.

* * * * *